March 4, 1969  R. F. WEEKS ET AL  3,431,552
METHOD AND APPARATUS FOR ANALYZING LOGGING INFORMATION
Filed Feb. 15, 1967

INVENTORS.
RICHARD F. WEEKS &
G. L. SAMODAI
BY
Brumbaugh, Free, Graves & Donohue
their ATTORNEYS

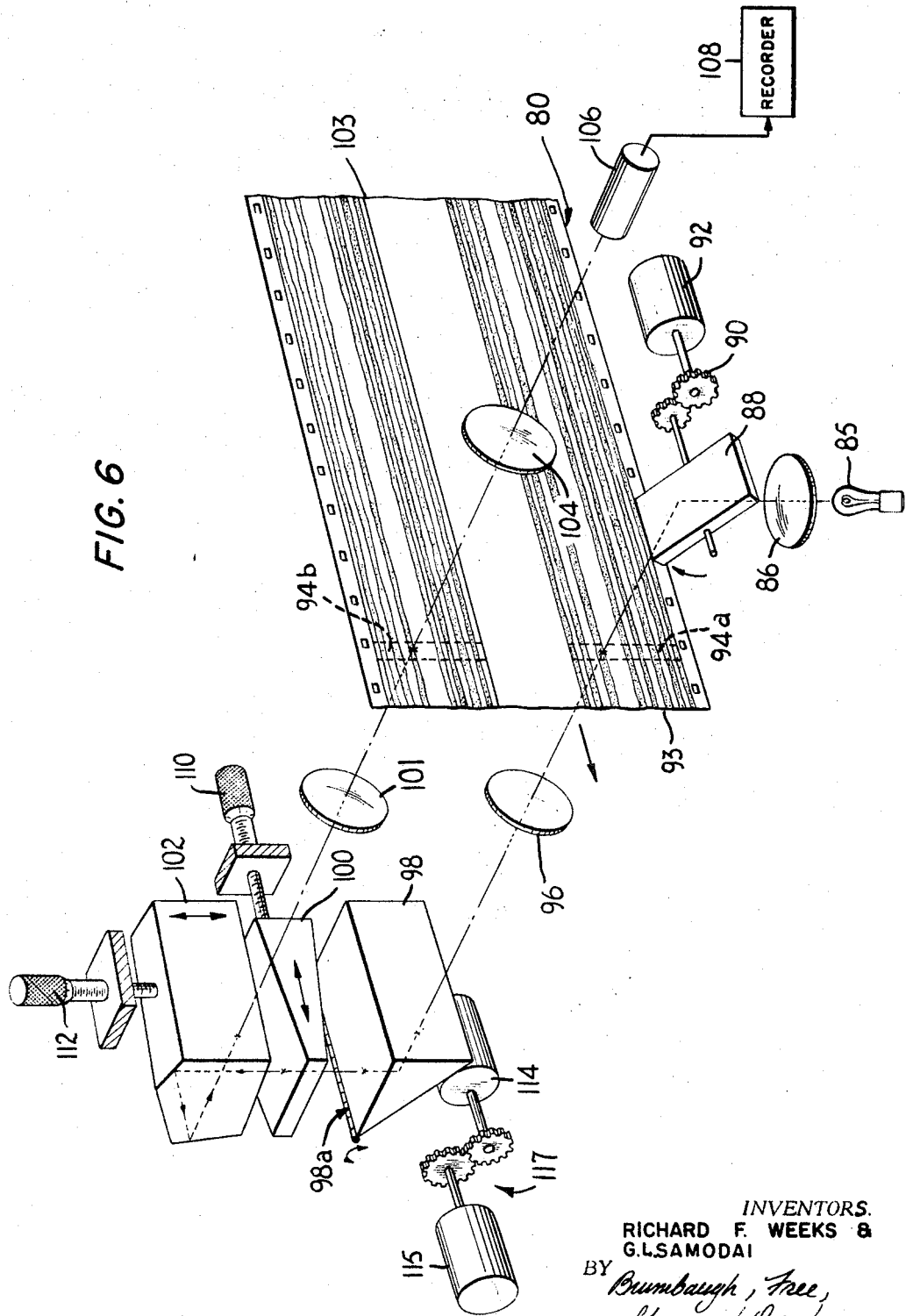

United States Patent Office 3,431,552
Patented Mar. 4, 1969

3,431,552
METHOD AND APPARATUS FOR ANALYZING LOGGING INFORMATION
Richard F. Weeks, Bristol, and Gyula L. Samodai, Danbury, Conn., assignors to Schlumberger Technology Corporation, Houston, Tex., a corporation of Texas
Filed Feb. 15, 1967, Ser. No. 616,360
U.S. Cl. 340—15.5                    20 Claims
Int. Cl. G01v 1/00

ABSTRACT OF THE DISCLOSURE

Method and apparatus for analyzing logging information recorded in first and second successions of mutually displaced transverse lines across at least one elongate, continuously moving film, in which each succession represents a logging record and is simultaneously scanned with a transversely sweeping light beam to develop an electrical signal representing a comparison between the optical transmissivities of segments of the corresponding recorded lines of each succession. A line scan tube or rotating mirror forms a transversely moving image of the small segments of a line in the first record and the image is projected onto the corresponding line of the second record, in the same relative position, the final image intensity being modulated by the information contained on both records and converted into an electrical signal by a photodetector. The amplitude of the electrical signal represents an instantaneous value of a desired logging parameter.

---

This invention relates to the inspection and analysis of data obtained from the logging of earth boreholes. Specifically, the invention concerns improved methods and apparatus for continuously analyzing logging information carried by a pair of logging records to determine a desired characteristic of the formations surrounding the borehole.

In recent years, acoustic logging techniques for probing formations surrounding a borehole have made available information from which several properties of the formations may be determined. In general, logging information is received in the form of electrical signals and stored or recorded as a logging record for later examination. These recorded signals must then be interpreted in order to derive the properties and characteristics of a formation. Among the various types of information obtainable with acoustic logging techniques is the velocity, or conversely the travel time, of acoustic energy between a pair of acoustic transducers spaced longitudinally in the borehole. Velocity and travel time are variable parameters which provide information from which important properties of the formations may be developed. In some cases, the logging equipment processes the electrical signals produced by the receiving transducer or transducers in response to transmitted acoustic energy directly to generate the travel time log. Often, however, it is desirable to make permanent records of the electrical signals themselves, as they appear at the outputs of the receiving transducers, for later comparison and analysis.

For example, when acoustically logging a borehole lined with a metal casing, the electrical signals generated by the receiving transducers ordinarily contain a first waveform portion corresponding to the arrival of the acoustic energy reaching the receiver directly through the casing, and a second waveform portion representing the arrival of compressional acoustic energy that has travelled through the formations. In addition, a third waveform portion representing the arrival of a shear, or Rayleigh, acoustic wave, may be present.

In general, either the second or third waveform portions, representing the arrival of acoustic energy passing through the formations, are of primary interest in determining the properties of the formations. Where the signals are recorded (as a function of time) on a record medium, such as photographic film, travel time $\Delta t$ can be derived by measuring the physical displacement along the acoustic transducers spaced longitudinally in the borehole. Velocity and travel time are variable parameters which provide information from which important properties of the formations may be developed. In some cases, the logging equipment processes the electrical signals produced by the receiving transducer or transducers in response to transmitted acoustic energy directly to generate the travel time log. Often, however, it is desirable to make permanent records of the electrical signals themselves, as they appear at the outputs of the receiving transducers, for later comparison and analysis.

For example, when acoustically logging a borehole lined with a metal casing, the electrical signals generated by the receiving transducers ordinarily contain a first waveform portion corresponding to the arrival of the acoustic energy reaching the receiver directly through the casing, and a second waveform portion representing the arrival of compressional acoustic energy that has travelled through the formations. In addition, a third waveform portion representing the arrival of a shear, or Rayleigh, acoustic wave, may be present.

In general, either the second or third waveform portions, representing the arrival of acoustic energy passing through the formations, are of primary interest in determining the properties of the formations. Where the signals are recorded (as a function of time) on a record medium, such as photographic film, travel time $\Delta t$ can be derived by measuring the physical displacement along the time axis between the significant waveform peaks or cycles on the respective traces.

In logging through tightly-bonded borehole casings, the extraction of the desired formation waveform portion from the total signal is not difficult since it is ordinarily of substantially greater amplitude and thus easily distinguishable from the casing arrival. If the bond between the casing and the borehole is poor, however, the amplitude of the formation signal waveform is often smaller than the amplitude of the casing signal waveform. This fact complicates the analysis of the logging records because it is often difficult to distinguish the formation arrival signal from the casing arrival signal.

As mentioned above, the formation travel time $\Delta t$ of an acoustic signal between a pair of spaced acoustic receivers can be determined by measuring the physical displacement of corresponding peaks of the acoustic signals from the respective receivers. This is customarily accomplished by positioning a cross-hair on the logging record or display and measuring the physical distance between selected corresponding peaks of the formation arrival waveforms. Obviously, this is a tedious and time-consuming process, particularly when the separation between casing and formation signals are ill-defined, and impedes accurate and rapid analysis of the borehole logs, which may be several hundred inches long.

The present invention has among its objects, therefore, the provision of improved methods and apparatus for extracting and analyzing acoustic travel time and other information from a pair of records upon which the electrical signals from the downhole transducers have been recorded. Briefly, analysis is accomplished by recording successive electrical arrival signals from the transducers, which are variable with time, in separate series of transverse lines disposed across at least one elongate record medium normal to the direction of elongation of the medium, which may be a strip of film. Preferably, the transverse lines of each series correspond to various borehole depths at which measurements are obtained. Each series of transverse lines therefore comprises a separate longitudinally extended logging record. In one form of recorded log, the transverse lines of each record have variable density whereby the opacity along each line varies in accordance with the strength of the recorded electrical signal.

The desired information, e.g., $\Delta t$, is obtained by conveying the record medium through a scanning zone and simultaneously scanning the corresponding transverse lines of each record with a scanning beam executing scansions normal to the record medium (parallel to the lines), the scanning preferably being carried out by sweeping a light beam along the transverse lines of one record and projecting the image formed thereby onto the second record. An output signal is then developed by detecting the amount of light from the projected image that is transmitted through the second record.

Preferably, the electrical signal to be recorded in one of the records is reversed in phase relative to the other electrical signal prior to recording so that the optical densities at corresponding positions of the respective records are inversely related. In this manner, the detected light transmission will indicate changes in the relative arrival times of acoustic signals at the respective transducers.

For a better understanding of these and other aspects of the invention, together with the further advantages and objects thereof, reference may be made to the following detailed description and to the accompanying drawings, in which:

FIGURE 6 is a schematic representation of another form of system for analyzing information recorded on a single record medium of the type shown in FIGURE 3.

Figure 1:
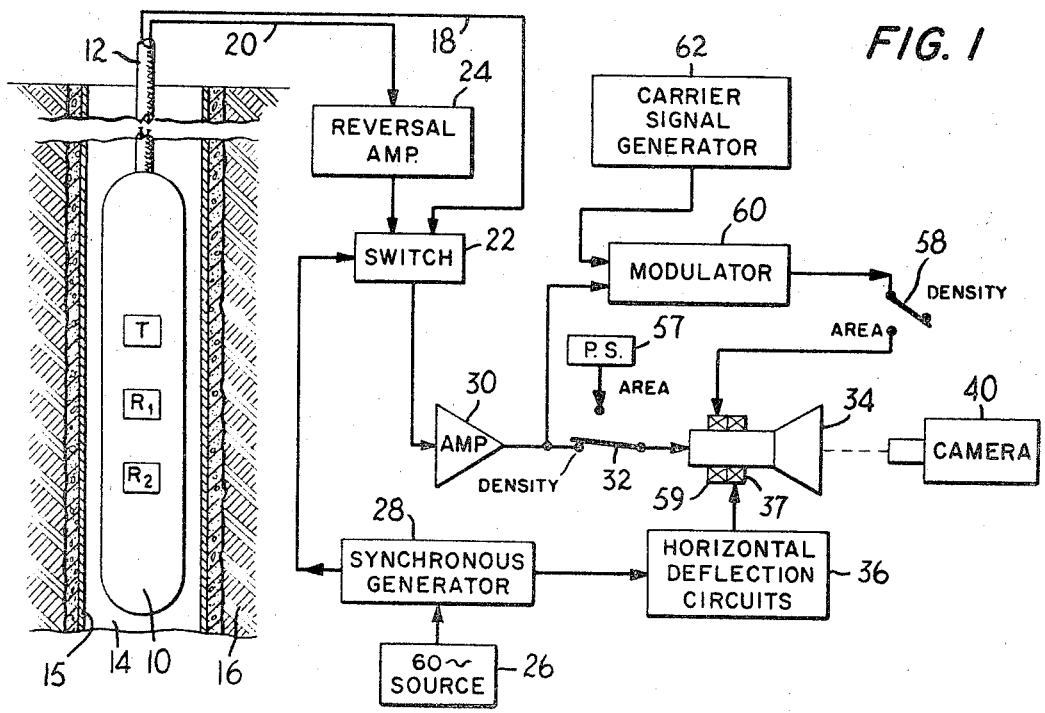
FIGURE 1 is an electrical block diagram of a system for recording electrical signals derived from a pair of acoustic transducers to produce logging records of the type suitable for use according to the invention.

FIGURE 1 depicts a system for recording acoustic signals on a record medium for analysis in accordance with the present invention. A well tool or sonde 10 is supported by a cable 12 in the borehole 14 to be logged, and carries an acoustic transmitter T and a pair of acoustic receiving transducers $R_1$, $R_2$. Electrical logging signals are generated by the acoustic receivers $R_1$ and $R_2$ in response to received acoustic energy transmitted by the transmitter T through the borehole casing 15 and into the formations 16 whose characteristics are to be determined. Part of the acoustic energy travels longitudinally of the borehole 14 through the casing 15, while another part of it passes into the formations 16 and radiates outwardly and downwardly towards the receivers $R_1$, $R_2$. The acoustic waves conveyed by the casing 15, will, in general, arrive at the respective receivers $R_1$, $R_2$ prior to the arrival of acoustic waves traveling through the formations 16. The receivers $R_1$, $R_2$ translate the variations in received acoustic energy intensity into electrical signals, which are transmitted over the conductors 18 and 20 in the cable 12 to the surface equipment.

The electrical signals generated by the receiver $R_1$ are transmitted to the surface over the conductor 18 and applied to one input terminal of a two-position switch 22, which may be either of the electromechanical or electronic type. Electrical signals generated by the receiver $R_2$ reach the surface over the conductor 20 and are supplied to a reversal amplifier 24 that inverts the phase of the signals. The inverted signal is then applied to a second input terminal of the switch 22.

During logging, the sonde 10 is slowly drawn up the borehole 14 and the transmitter T is periodically excited in synchronization with a 60 cycle power source, such as the one designated at 26, to transmit repetitive bursts of acoustic energy into the formations. Also driven by the source 26 is a synchronous generator 28, which supplies pulses to energize and de-energize the switch 22 upon each activation of the transmitter T. Thus, the switch 22 selects the $R_1$ signal over the conductor 18 for passage to an amplifier 30 for a portion of the period between successive transmitted acoustic energy pulses, and selects the output of the reversal amplifier 24 (the inverted $R_2$ signal) during the remaining portion of this period. The switching rate of the switch 22 might be, for example, 10–20 cycles per second, depending on the spacing between receivers, and therefore upon the time it takes for the acoustic energy to travel the distance between receivers.

For variable density recording, i.e., for recording the electrical signals from the respective receivers as optical density variations on a film strip, the amplified signals at the output of the amplifier 30 are applied through the switch 32 in the "DENSITY" position directly to the cathode ray tube 34 for modulating the intensity of the CRT electron beam.

The synchronous generator 28 also supplies synchronizing pulses to the horizontal deflection circuits 36 which drive the horizontal deflection coil 37. When the switch 22 is in a position to select the signal from the receiver $R_1$, the horizontal deflection circuits 36 limit the horizontal sweep of the beam in CRT 34 to one-half of its normal sweep width. With the switch 22 activated to select the signal from the receiver $R_2$, the synchronous generator 28 supplies a signal to the horizontal deflection circuit 36 to reposition the electron beam to a second, intermediate position at the center of the CRT phosphor screen, from where the alternate sweeps of the beam begin. A camera 40, containing a strip of, say 70 mm. film moving at a rate of 5 inches for every 100 feet of travel of the sonde 10, photographs the face of CRT 34 so that the signals received from the receiver $R_1$ are recorded across one-half of the film width, and the signals received from the receiver $R_2$ are recorded across the other half of the film width. The result is a dual channel log in which each channel is recorded with the signals from one of the receivers $R_1$, $R_2$.

Figure 2:
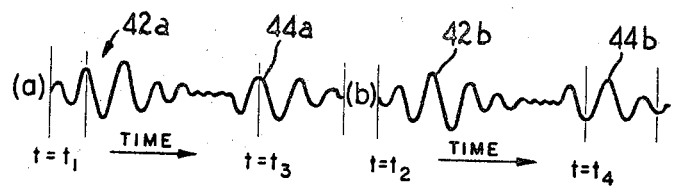
FIGURE 2 is a graph of a pair of typical electrical signals which are to be recorded and analyzed in accordance with the present invention.

FIGURE 2 depicts typical electrical signals of the type generated by the electroacoustic receivers $R_1$, $R_2$ in response to acoustic energy transmitted by the transmitter T, graph $a$ representing, for example, the signal generated by the receiver $R_1$ and applied directly to the switch 22 (FIGURE 1), and graph $b$ the phase inverted $R_2$ signal at the output of the amplifier 24. The signals include a first series of waveform cycles 42$a$, 42$b$ corresponding to the casing arrival, followed by a second series of waveform cycles 44$a$, 44$b$ corresponding to the acoustic formation arrival. It should be noted that the signal from the receiver $R_1$ shown in graph $a$ begins at a time $t=t_1$; the occurrence of the $R_2$ signal, however, is later than the $R_1$ signal, since the receiver $R_2$ is farther away from the transmitter T, and begins at a time $t=t_2$. The difference in these arrival times, $t_2-t_1$, equals $\Delta t$ and may be in the range of about 50–100 milliseconds. In practice, the quantity $\Delta t$ can be determined by measuring or obtaining an indication of the difference between the arrival times of selected portions of the signals as, for example, between the arrival times $t_3$, $t_4$ of corresponding peaks of the respective electrical signals.

Figure 3:
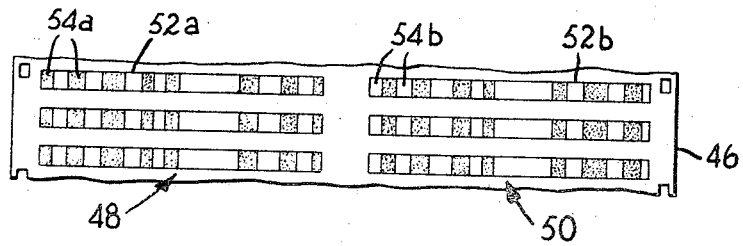
FIGURE 3 is a plan view of a portion of a record medium resulting from the recording of the electrical signals shown in FIGURE 2.

FIGURE 3 shows a greatly exaggerated view of a portion of a film 46 which has been recorded by the FIGURE 1 system with the electrical signals depicted in graphs a and b of FIGURE 2. Each of the channels or records 48, 50 occupies approximately ½ of the film width, and is composed of a series of transverse lines 52a, 52b disposed across the film. As the beam from the cathode ray tube 34 sweeps across one-half of the width of the moving film strip 46, its intensity is modulated by one of the electrical receiver signals. This causes the signal to appear on the film strip 46, after processing, as optical density variations across the strip, with the optical density along the path of the beam corresponding to the instantaneous amplitude of the beam-modulating signal. In FIGURE 3, dark (high density) portions of the transverse lines 52a, 52b correspond to the higher positive amplitude portions of the electrical signal, as would be the case in an original negative film record. In practice, however, a positive release print or exposure of the original film negative in which minimum signal amplitudes would correspond to maximum opacity (highly developed) portions of the record may be used, as well.

As illustrated, the phase-reversed $R_2$ signal (FIGURE 2b) is recorded in the right-hand channel 50 of the film strip 46, and the $R_1$ signal in the left-hand channel 48. Because of the phase reversal of the $R_2$ signal, the optical density of elemental areas 54a of the recorded lines 52a will be inversely related to the corresponding elemental areas 54b of the lines 54a.

Figure 4:
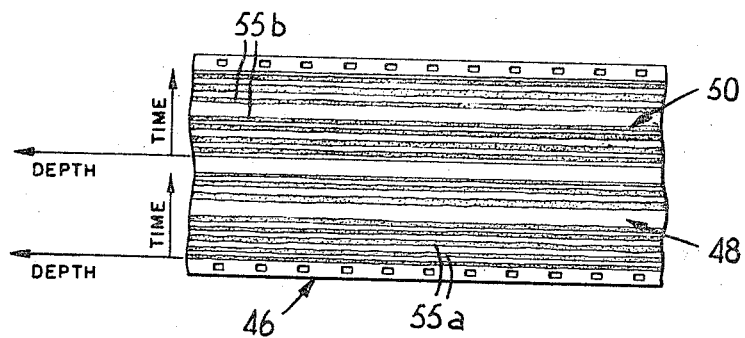
FIGURE 4 is a plan view of an extended longitudinal portion of a record medium of the type shown in FIGURE 3.

As observed in FIGURE 4, the dark areas of successive recorded lines 52a, 52b of the records form longitudinally extending record lines 55a, 55b, respectively, the transverse positions of which along the film 46 correspond to the time of arrival of the casing and formation arrival waveforms as a function of the depth of the logging tool 10. As will be explained shortly, the recorded format of the film 46 permits continuous analysis of the recorded information by simultaneously scanning the corresponding lines 52a, 52b of the channels 48, 50 as the film is transported longitudinally through a scanning zone.

Variable area recording of the film strip 46 can also be used to record the electrical signals from the downhole logging equipment. In this type of recording, the transverse lines of the records are recorded with constant optical density, the width of the line varying in accordance with the amplitude of the received signal. Returning to FIGURE 1, for variable area recording of the film strip, the switches 32 and 58 are thrown to the "AREA" position, and the amplified signals from the amplifier 30 are routed to a modulator 60 which amplitude-modulates a carrier signal supplied from the generator 62 in accordance with the electrical signals selected by the switch 22. The modulated carrier from the output of the modulator 60 is then fed through the switch 58 to the vertical deflection coil 59 of the cathode ray tube 34.

With the switch 32 in the "AREA" position, the cathode of the CRT 34 is supplied with a constant potential from a power supply 57. The trace on the screen of the CRT is therefore a line of modulated width and uniform brightness, the instantaneous line width depending on the strength of the modulating signal. When using variable area recording, it is preferable that the illuminated spot on the phosphor screen of the CRT 34 be as fine as possible in order that the carrier signal can be traced out on the screen with acceptable resolution.

Figure 5:
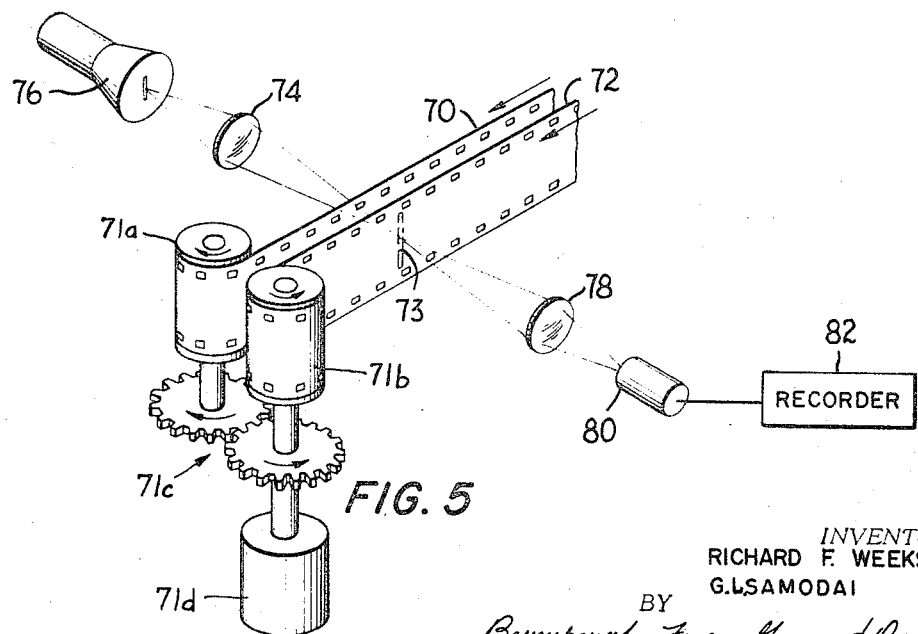
FIGURE 5 is a schematic representation of one form of system for analyzing, in accordance with the invention, logging information recorded on separate record mediums.

Turning now to FIGURE 5, there is shown a basic system for analyzing the records of signals from the receivers $R_1$, $R_2$, which have been recorded on separate record mediums 70, 72. Separate records can be produced in the FIGURE 1 system, for example, by using a separate cathode ray tube and camera for each record. As explained above and observed in FIGURE 2, the electrical signals from the acoustic receivers $R_1$, $R_2$ usually have the same general appearance, although delayed or displaced along the time axis of the record, and of different amplitudes. It can be predicted that successive electrical signals from the receivers $R_1$ and $R_2$ will have a constant time displacement if the received acoustic waves each traverse a homogeneous formation. When, however, a discontinuity or non-homogeneity is encountered by the acoustic waves reaching either receiver, this displacement will be altered. Accordingly, such alterations can be detected, in accordance with the invention, by simultaneously scanning the corresponding transverse lines of the records.

In FIGURE 5, this is accomplished by positioning the film strips 70, 72 so that the transverse lines recorded with the $R_1$ and $R_2$ signals generated for each transmission of acoustic energy by the transmitter T are in alignment along the time and depth axes of the records. The film strips are connected to driven takeup spools 71a and 71b that are coupled through a suitable gearing arrangement 71c to a motor 71d, all shown schematically in FIGURE 5. The film strips 70, 72 are then conveyed together through a scanning area or zone, indicated generally at 73, where a lens 74 focuses the beam of a moving light spot from a cathode ray or line scan tube 76 in a common plane between the closely spaced films. The light from the beam passing through the strip 70 forms an image of the portions of the record impinged thereby, which is projected onto the record carried by the strip 72. The light transmitted by the film strip 72 is then refocused by a collecting lens 78 onto a photo detector 80, which develops an electrical signal in response to the intensity of the light transmitted by both mediums 70, 72.

Once the film strips 70, 72 have been aligned along their depth and time axes, a change in the relative arrival times of the respective recorded signals will be accompanied by variations in the amount of light transmitted through the film strips 70, 72, and thereby by variations in the amplitude of the output signal developed by the photodetector 80. This output signal is recorded on the recorder 82 which then provides a direct indication of the $\Delta t$ variations. It will be apparent that $\Delta t$, as well as variations in $\Delta t$, can be determined using the described system. In order to record $\Delta t$, the film strips 70, 72 can be positioned so that the light and dark elemental areas of the corresponding transverse record lines are not in exact alignment along the time axes. In this case, the photodetector 80 will receive a residual transmission of light from the scanner 76 that is proportional to the desired quantity $\Delta t$.

Referring now to FIGURE 6, there is shown a system for simultaneously scanning a single film strip 80 which has been recorded with electrical signals from the respective receivers $R_1$, $R_2$ (FIGURE 1) in the manner explained above. A high intensity light source 85 is imaged through a lens 86 onto a rotating silvered mirror 88 driven through a suitable gear assembly 90 by an electric motor 92. The film strip 80 is transported by a suitable mechanism (not shown) longitudinally of its extent through the scanning zone 94a so that the light spot imaged on the lower record 93 of the film strip 80 by the rotating mirror scans each of the recorded transverse lines seriatim. The image of the scanned information of the lower record 93 next passes through a lens system 96 to a right angle prism 98.

From the prism 98, the image passes through a refraction prism 100 to a penta or penta root prism 102, which inverts and directs the image back toward the film strip 80. Traveling toward the film 80, the image encounters another lens system 101, which projects a focused image of the scanned information of the first record 93 onto the second channel or record 103 on the film 80. A further lens 104 intercepts the projected image of the first record, as altered by its transmission through the second record, and passes it to the photodetector 106. The photodetector 106, as in the system of FIGURE 5, develops an electrical signal of which the amplitude varies in accordance with variations in the combined optical transmissivities of the scanned portions of the respective records 93, 103, and presents this signal to a recorder 108.

From the foregoing, it is observed that the light from the source 85, modulated in intensity by its passage through the record 93 in the scanning area 94a, also scans the portion of the record 103 presented to the scanning area 94b. In order to ensure that the images of the elemental portions of a scanned line of the record 93 are projected onto corresponding elemental areas of the lines recorded in the upper record 103, the scanning area 94b may be shifted relative to the position of the scanning area 94a. This is accomplished by energizing the actuating device 110 to adjust, in the directions indicated by the arrows, the position of the refraction prism 100 to direct the projected image to the desired location on the depth axis of the record 103. The penta prism 102 also is movable in the directions indicated by a similar actuating device 112, so that the image of the scanned lines of the record 93 are in the desired alignment along the (transverse) time axis with the scanned lines of the second record 103. In practice, the prisms 109 and 102 are initially adjusted to properly position the location of the scanning area 94b, and ordinarily need not be readjusted thereafter.

If, during scanning, the image of the lower record 93, is cyclically oscillated or swept in a direction parallel to the recorded transverse lines of the upper record 103, an indication representing minimum and maximum light transmissivity through the film strip 80 may be obtained. Accordingly, a corresponding maximum and minimum amplitude electrical signal will be generated by the photodetector 106 to indicate the "best fit" of the two records along the time axis.

In the FIGURE 6 system, this is effected by rotating the eccentric cam 114 energized by the electric motor 115 and gear assembly 117 to pivot the right angle prism 98 about a pivot line parallel to the edge 98a. When rotated, the cam 114 slowly pivots the prism 98 back and forth between first and second positions so that the image projected on the upper channel 103 of the film strip 80 is shifted slowly up and down over a small displacement range. The rate of shift of the projected image in the scanning area 94b is preferably substantially slower than the scanning rate determined by the speed of rotation of the mirror 88. The minimum light transmission received by the photodetector 106 then indicates the best match or fit or time axes of the two records 93, 103 and, consequently, the desired quantity Δt at minimum system error. When the best fit is reached, rotation of the cam may be stopped if desired. Alternatively, of course, the projected image may continue to be cyclically shifted by the action of the cam 114 to gain, in effect, a continuous periodic sampling of the best match.

From the preceding, it will be appreciated that the invention provides improved apparatus and methods for rapidly analyzing recorded logging signals. Once the scanning system has been adjusted, the apparatus gives a continuous electrical output signal representative of a desired variable quantity, such as travel time, which may be recorded by the recorder as a function of logging tool depth. It is moreover realized that the disadvantages of manual methods of logging record analysis have been completely eliminated.

Although the invention has been described with reference to specific embodiments thereof, it is understood that many modifications and variations, both in form and detail, may be made within the skill of the art. All such modifications and variations, therefore, are intended to be included within the scope and spirit of the appended claims.

We claim:

1. Apparatus for analyzing borehole logging information to determine the characteristics of a variable quantity from first and second time variable information parameters comprising, in combination:

at least one elongated light transmissive record medium for carrying first and second records, respectively, of the first and second information parameters to be analyzed, each record being composed of a series of mutually displaced transverse lines disposed across the medium normal to the direction of elongation, the lines containing a record of a respective one of the time variable parameters;

means for simultaneously scanning the transverse line series of each record with a radiant energy beam tracing out successive mutually displaced transverse scan lines on the medium to produce scan images of a comparison of the first and second parameters; and means responsive to the scan images for developing an electrical signal representative of the variable quantity.

2. Apparatus as defined in claim 1, in which:

the radiant energy beam scans the lines of the first record of the record medium in a scanning zone to form corresponding scan images of the first information parameter impinged by the beam, the scanning means including means for projecting the scan images of the first parameter in superimposed relation to the lines of the second record.

3. Apparatus in accordance with claim 2 in which:

the transverse lines of the first and second records have a radiant energy transmissivity characteristic which varies in accordance with the information contained therein, and the means responsive to the scanning means is operable to translate into corresponding electrical signals the radiant energy intensity of the projected image transmitted through the second record of the medium.

4. Apparatus as defined in claim 2, in which:

the successive transverse scan lines are stationary relative to the scanning zone, the apparatus further comprising:

means for continuously conveying the record medium through the scanning zone in the direction of its extent so that the radiant energy beam scans seriatim each of the transverse lines of the respective records.

5. Apparatus in accordance with claim 2, further comprising:

means for simultaneously cyclically displacing the projected scan images of the first information parameter in a direction substantially parallel to the transverse series of lines of the second record.

6. Apparatus as set forth in claim 5, in which:

the rate of cyclical displacement of the image projected on the second record is less than the scanning rate of the scanning means.

7. Apparatus in accordance with claim 2, in which:

the record medium is a film strip; and the transverse line series of the respective records consist of opacity variations of which the opacity varies in accordance with variations in the respective parameters, at respective different borehole depths.

8. Apparatus as defined in claim 7, in which:

the parameters recorded in the first and second records represent acoustic transmission through the formations surrounding a borehole between first and second acoustic transducers, respectively, at the different borehole depths.

9. Apparatus in accordance with claim 2, in which the scanning means comprises:

a source for producing a beam of light;

a rotating mirror operable to sweep the beam of light across the record medium in a direction substantially parallel to the transverse lines of the first record; and optical transfer means interposed in the path of the light beam between the source and the medium for focusing the light beam in the plane of the first record.

10. Borehole logging apparatus for obtaining and analyzing logging information corresponding to discrete borehole depths to determine the characteristics of a time variable quantity from first and second variable information parameters comprising, in combination:

a well tool adapted to be moved through the borehole and including an acoustic transmitter for transmitting acoustic energy through the formations surrounding the borehole and a pair of acoustic receivers for generating first and second electrical signals representing the respective variable parameters in response to transmitted acoustic energy received thereby at each discrete depth of the well tool in the borehole;

means for recording the first and second electrical signals in first and second records on at least one record medium, each record composed of a series of transverse lines disposed across the medium, each line representing the respective parameter at a corresponding different depth of the well tool in the borehole;

means for simultaneously scanning the corresponding transverse lines of each record obtained at a given depth of the well tool in the borehole; and means responsive to the scanning means for generating an electrical output representative of the variable quantity.

11. Apparatus as set forth in claim 10, in which the scanning means includes:

means for developing optical images of portions of the scanned lines of each record, and means for comparing the instantaneous intensity of the optical images so developed.

12. Apparatus as defined in claim 11, in which:

the recording means is effective to record the lines of the records as variations in opacity which correspond to amplitude variations of the respective electrical signals, the opacity variations of the first record lines being inversely related to the opacity variations of the second record lines for like amplitude variations of the respective electrical signals.

13. A method for analyzing borehole logging information obtained at various discrete depths in the borehole to determine the characteristics of a variable quantity from the comparison of two time variable parameters represented by first and second electrical signals developed at each discrete borehole depth, comprising the steps of:

recording the first and second electrical signals in first and second records of at least one elongated record medium, respectively, each composed of a series of transverse lines disposed across the medium and mutually displaced as a function of borehole depth;

simultaneously scanning with a transversely scanning beam the corresponding transverse lines of each record to compare the information therein; and generating, in response to the scanning of the records, an electrical output signal representing the variable quantity.

14. A method according to claim 13, in which:

the records are transversely scanned by sweeping a radiant energy beam across the medium in a scanning zone and in a direction substantially parallel to the transverse lines of the first record to form a radiant energy image of the portion of the first record impinged by the beam, and projecting the image of the first record portion onto a corresponding portion of the second record so that the projected image sweeps in a direction substantially parallel to the transverse lines thereof.

15. A method according to claim 13, in which:

the scanning of the first and second records produces first and second corresponding images of the scanned portions thereof, and the electrical signal is developed by comparing the intensity of the images of the respective records.

16. A method according to claim 13, in which:

the transverse lines of the first and second records are recorded to have a radiant energy transmissivity characteristic which varies in accordance with amplitude variations in the respective electrical signals, and the output signal representing the variable quantity is generated by detecting the intensity of the projected image of the first record transmitted by the second record.

17. A method as defined in claim 13, further comprising the step of:

continuously conveying the medium through the scanning zone so that the radiant energy beam scans the lines of the respective record seriatim.

18. A method as set forth in claim 13, further comprising the step of:

cyclically displacing, during scanning and at a rate substantially less than the line scanning rate, the projected radiant energy image of the first record in a direction substantially parallel to the transverse lines of the second record.

19. A method as set forth in claim 13, wherein:

the electrical signals recorded in the first and second records represent acoustic transmission through a formation surrounding a borehole between first and second acoustic transducers, respectively.

20. A method as defined in claim 13, in which:

the transverse lines of the first and second records are recorded to consist of opacity variations which correspond to amplitude variations of the respective electrical signals; and the opacity variations of the first record lines are inversely related to the opacity variations of the second record lines for like amplitude variations of the respective electrical signals.

References Cited

UNITED STATES PATENTS

| 2,712,415 | 7/1955 | Piety. |
| 2,839,149 | 6/1958 | Piety. |
| 3,030,021 | 4/1962 | Ferre. |
| 3,153,222 | 10/1964 | Fomenko. |
| 3,243,771 | 3/1966 | Roark et al. _____ 340—15.5 |
| 3,281,773 | 10/1966 | Newman _____ 340—15.5 |
| 3,283,133 | 11/1966 | Field _____ 340—15.5 X |

RODNEY D. BENNETT, *Primary Examiner.*

D. C. KAUFMAN, *Assistant Examiner.*

U.S. Cl. D.X.

88—1; 340—18